United States Patent [19]
Pickhardt et al.

[11] Patent Number: 6,049,869
[45] Date of Patent: *Apr. 11, 2000

[54] METHOD AND SYSTEM FOR DETECTING AND IDENTIFYING A TEXT OR DATA ENCODING SYSTEM

[75] Inventors: Julie A. Pickhardt, Kirkland; Christopher H. Pratley, Seattle, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/943,919

[22] Filed: Oct. 3, 1997

[51] Int. Cl.$^7$ ........................................................ G06F 7/02
[52] U.S. Cl. ............................................ 712/300; 707/536
[58] Field of Search ........................... 707/516, 536; 712/898, 300; 704/1, 2, 3, 4, 5, 6, 7

[56] References Cited

U.S. PATENT DOCUMENTS

| | | | |
|---|---|---|---|
| 5,548,507 | 8/1996 | Martino et al. | 704/1 |
| 5,634,134 | 5/1997 | Kumai et aL. | 704/8 |
| 5,640,587 | 6/1997 | Davis et al. | 704/2 |
| 5,715,466 | 2/1998 | Flanagan et al. | 704/5 |

OTHER PUBLICATIONS

Lunde, Ken *Understanding Japanese Information Processing*, (1993) pp. 11–19, 59–100, 159–194, 307–324.

Kano, Nadine *Developing International Software for Windows 95 and Windows NT: A Handbook for International Software Design*, (1995) pp. 57–109.

The Unicode Consortium *The Unicode Standard, Version 2.0*, (1991) pp. 2–1 through 4–25.

*An Online Companion to Understanding Japanese Information Processing* (1996) (available from ftp://ftp.ura.com/pub/examples/nutshell/ujip/doc/cjk.inf).

*Primary Examiner*—Richard Ellis
*Attorney, Agent, or Firm*—Jones & Askew, LLP

[57] ABSTRACT

Detecting an encoding system used to encode computer readable text or data across a wide variety of encoding systems. When a user attempts to download and use text or data on his or her computer, encoded data is passed from the desired text or data file to a series of code readers. Each code reader is programmed to read encoded data according to the rules of a given encoding system. When a given code reader is unable to validate a byte of data according to the encoding system rules associated with that reader, that reader is deactivated. This process of elimination leads to a single reader and a single encoding system. If the list of readers is not eliminated to a single reader, ambiguity resolution is performed to narrow the list of readers to a single reader. Once the list of active readers is narrowed to one, the encoding system associated with that reader is returned as the encoding system with which the data is encoded. Finally, statistics gathered on the data as it is read are used to confirm and augment detection of the encoding system.

18 Claims, 5 Drawing Sheets

METHOD AND SYSTEM FOR DETECTING AND IDENTIFYING A TEXT OR DATA ENCODING SYSTEM

FIELD OF THE INVENTION

This invention relates to analysis and detection of encoded text and data. More particularly, this invention relates to analyzing encoded text or data in a computer readable text or data file to determine the encoding system utilized for encoding that text or data.

BACKGROUND OF THE INVENTION

In recent years, use of computers has increased dramatically worldwide. As a consequence, users of computers receive a variety of text and data files from many sources around the world. Such text and data files may be downloaded from any suitable computer readable medium or from a remote server or web site on the now familiar Internet.

In text or data files, the primary data content is characters which include letters, numbers, punctuation marks, or other symbols or control codes that are represented to computers in a code which is meaningful to the computer. A character is stored in a numeric representation sometimes referred to as its code-point. There exist mappings that assign numeric representations to characters. These mappings are typically known as encodings, or sometimes code pages. For example, in the US-ASCII encoding system, the numeric code-point "97" is "lowercase a" and in Japanese Shift-JIS, the code-point "33,484" is the character "no."

Because different countries often have their own character sets and encoding systems, there are many different encoding systems. Each has its own set of rules. If a computer's code reader does not have the proper set of rules, it is impossible for the code reader (and the computer) to understand or correctly read the data. There is no way to place a byte data into context, making meaningful interpretation of the data very difficult.

In the case of the Internet, international HTML documents are very common on the World Wide Web. These international documents are often written in languages other than English and are therefore often encoded with encoding systems other than US-ASCII. In order for the documents to be read and displayed correctly by a user's computer, the browsing software (User Agent or UA) must know the encoding system used to encode the data contained in the document. Because this is a common problem, there are mechanisms in HTML for communicating the encoding system of a Web document to the reader of that document. However, these mechanisms have not been commonly used in practice. To counteract this problem, UAs typically include some limited form of encoding system detection.

Past encoding system detection methods typically have focused on Japanese encoding systems. UAs also typically provide a means for their users to choose (and thereby force) a specific encoding system for the documents they browse. This assumes, however, that users are familiar with encoding systems utilized to encode the data the are attempting to use.

Those encoding system detection methods do not fully attempt to read the data in the supported encoding systems. Instead they focus only on looking for invalid lead-bytes, invalid lead-byte/trail-byte combinations, or in the case of ISO-2022-JP (JIS), the special identifying byte sequences. No use has been made of additional information such as common character sequences or unmapped code-points. No attempts have been made to deal with ambiguous input.

Some statistical-based encoding system detection methods have been used which attempt to recognize common patterns of characters in text or data, for example, "es" or "the" in English. To configure such systems, statistics are typically gathered on a large sample of documents. Those encoding system detection methods compare the data read against the patterns represented by the statistics to determine likelihood of a match against a given encoding. The success, however, of detecting the encoding system in an arbitrary document depends on how closely that document resembles the data on which the statistics were gathered.

Therefore, there is a need in the art for an efficient method and system for detecting a particular encoding system from a variety of different encoding systems. There is also a need in the art for a method and system for detecting an encoding system by detecting invalid lead-bytes, invalid lead-byte/trail-byte combinations, and special identifying byte sequences in concert with detection of common character sequences or unmapped code-points. There is a further need in the art for a method and system for detecting an encoding system which resolves ambiguities between encoding systems and which uses statistical information about encoded data to augment encoding system detection.

SUMMARY OF THE INVENTION

The present invention satisfies the above described needs by providing a method and system for detecting an encoding system used to encode computer readable text or data across a wide variety of encoding systems. The present invention allows for detection of encoding systems by detecting invalid lead-bytes, invalid lead-byte/trail-byte combinations, and special identifying byte sequences in concert with the detection of common character sequences or unmapped code-points. The present invention allows for resolution of ambiguities between encoding systems and for the use of statistical information gathered on read data to augment encoding detection.

Generally described, when a user attempts to download and use text or data on his or her computer, encoded data is passed from the desired text or data file to a series of code readers. Each code reader is programmed to read encoded data according to the rules of a given encoding system. When a given code reader is unable to validate a byte of data according to the encoding system rules associated with that reader, that reader is deactivated. This process of elimination leads to a single reader and a single encoding system. If the list of readers is not eliminated to a single reader, ambiguity resolution is performed to narrow the list of readers to a single reader. Finally, statistics gathered on the data as it is read are used to confirm and augment the encoding system detection system.

More particularly described, one aspect of the present invention provides a method of detecting an encoding system used to encode text or data. The method includes the steps of obtaining encoded data and passing bytes of the data to a plurality of readers. The readers read bytes of the data according to rules associated with a particular encoding system where each of the plurality of readers is associated with a different particular encoding system.

A determination is made whether the bytes of data are valid bytes according to the rules associated with the particular encoding system associated with each reader. Each reader can determine whether the bytes of data complete a byte sequence unique to the particular encoding system associated with each reader. If the bytes of data complete a unique byte sequence, the particular encoding system associated with the unique byte sequence is returned as the encoding system used to encode the bytes of data. If the bytes of data do not complete the unique byte sequence, the readers that fail to determine the bytes are valid bytes are deactivated. The readers that determine the bytes are valid but do not recognize the bytes as a special byte sequence then determine whether the bytes of data complete a common character sequence for the particular encoding system associated with the reader.

If only one reader remains after deactivating any of the readers that fail to determine the bytes are valid bytes, the particular encoding system associated with the one remaining reader is returned as the encoding system used to encode the bytes of data. However if more than one reader remains after deactivating any of the readers that fail to determine the bytes are valid bytes, the control module chooses from among the remaining readers according to gathered statistics and preferences. Each remaining reader determines whether the bytes of data complete a common character sequence for the particular encoding system associated with each remaining reader.

Each remaining reader gathers statistical information on the bytes of data. Each remaining reader is then deactivated, except for the remaining reader with the highest number of common character sequences determined for the particular encoding system associated with each remaining reader. If one reader remains, the particular encoding system associated with the one remaining reader is returned as the encoding system used to encode the bytes of data. If more than one reader still remains, one reader is selected according to preferences associated with the encoded data and the particular encoding system associated with that reader is returned as the encoding system used to encode the bytes of data.

The selected reader and encoding system may be verified by reviewing the statistical information gathered on the data. Gathering statistical information on the data may include recording the number of low-ASCII bytes, recording the number of high-ASCII bytes, and determining the ratio of low-ASCII bytes to high-ASCII bytes.

In another aspect of the present invention, a system for detecting an encoding system used to encode text or data is provided. The system includes a control module operative to receive bytes of data from a data file and multiple readers. The readers are operative to receive the bytes of data one byte at a time from the control module. The readers can read the data according to rules associated with a particular encoding system, each of the plurality of readers being associated with a different particular encoding system.

The readers determine whether the bytes of data are valid bytes according to the rules associated with the particular encoding system associated with each reader, and the readers deactivate themselves upon encountering invalid bytes of data for the encoding systems associated with those readers. The readers are also operative to determine whether the bytes of data complete a byte sequence unique to the particular encoding system associated with each reader. If the readers determine the bytes of data complete a byte sequence unique to the particular encoding system associated with each reader, the readers may return the particular encoding system associated with the unique byte sequence as the encoding system used to encode the data.

The readers may also determine whether the bytes of data complete a common character sequence for any of the remaining encoding systems. If so, the readers keep count of the number of common character sequences determined, and the control module deactivates all of the remaining readers, except those associated with the highest number of common character sequences determined. The control module preferably is also operative to return one encoding system from the remaining encoding systems according to preferences associated with the encoded data, if more than one encoding system remains.

These and other features, advantages, and aspects of the present invention will be more clearly understood and appreciated from a review of the following detailed description of the disclosed embodiments and by reference to the appended drawings and claims.

DETAILED DESCRIPTION

Figure 1:
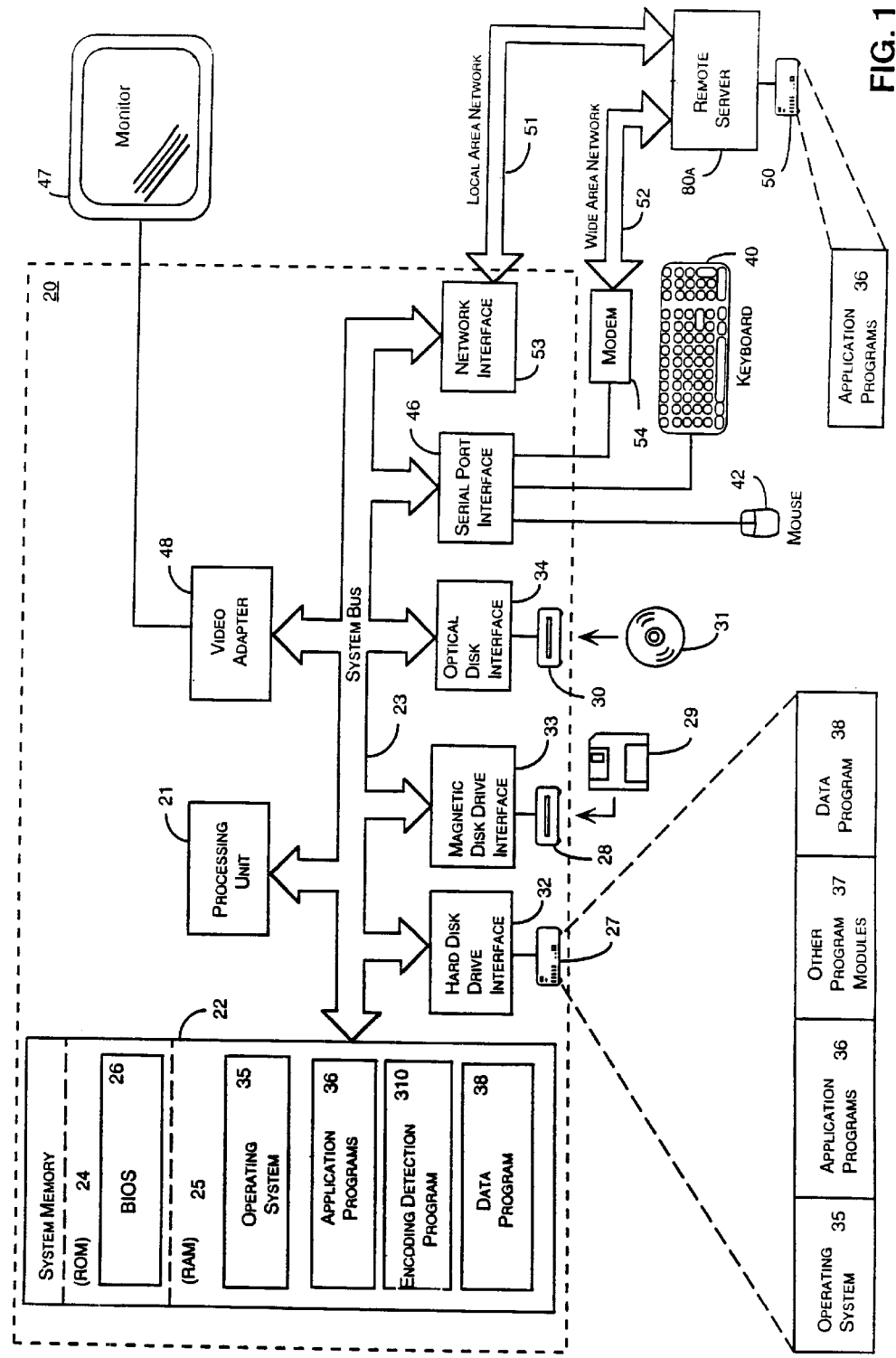
FIG. 1 is a block diagram of a computer that provides a portion of the operating environment for an exemplary embodiment of the present invention.

This invention is directed to analyzing encoded text or data in a computer readable text or data file to determine the encoding system utilized for that text or data. Determining the encoding system utilized for the data or text allows the coding reader of the user's computer to utilize the appropriate encoding rules to correctly read the data of text. As will be understood, the present invention may be used for detecting the encoding system of a text or data file encoded with one of a variety of different encoding systems when that text or data file is opened by a variety of calling applications, such as word processors, database applications, graphics applications, and the like. For example, if a user of an application program, such as "WORD," version 8.0, produced by Microsoft Corporation of Redmond, Washington, attempts to open a text file encoded using Japanese ISO-2022-JP encoding, the present invention may be used to determine with which encoding the text file is encoded in order to properly open the file on the user's computer.

The encoding detection system can pass the data contained in the text file to a series of code readers, each of which is capable of reading data according to a specified encoding system. The readers are deactivated when it is determined that the encoding systems with which they are associated do not match the encoding of the text or data file. Accordingly, by the process of elimination, the encoding system with which the text file is encoded is determined.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, calling, comparing, receiving, sending, reading, transferring, determining, routing, selecting, transmitting, etc. which are often associated with manual operations performed by a human operator. The operations described herein are machine operations performed in conjunction with various input provided by a human operator or user that interacts with the computer.

Referring now to the drawings, in which like numerals represent like elements throughout the several figures, aspects of the present invention and the preferred operating environment will be described.

Exemplary Operating Environment

FIG. 1 and the following discussion are intended to provide a brief, general description of a suitable computing environment in which the invention may be implemented. While the invention will be described in the general context of a program module, such as a software application, that runs on an operating system in conjunction with a personal computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more program modules 36, other program modules, such as the encoding system detection control module 310 of the present invention, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers. The remote computer may be a server, such as the server 80a, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet, which is illustrated in FIG. 2.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet 60. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As will be discussed in more detail below, an exemplary embodiment of the present invention provides for detecting the encoding system of a text of data file downloaded to the user's computer 20 from a remote server 80a via the Internet 60. Accordingly, it is helpful to briefly discuss aspects of the Internet 60.

Figure 2:
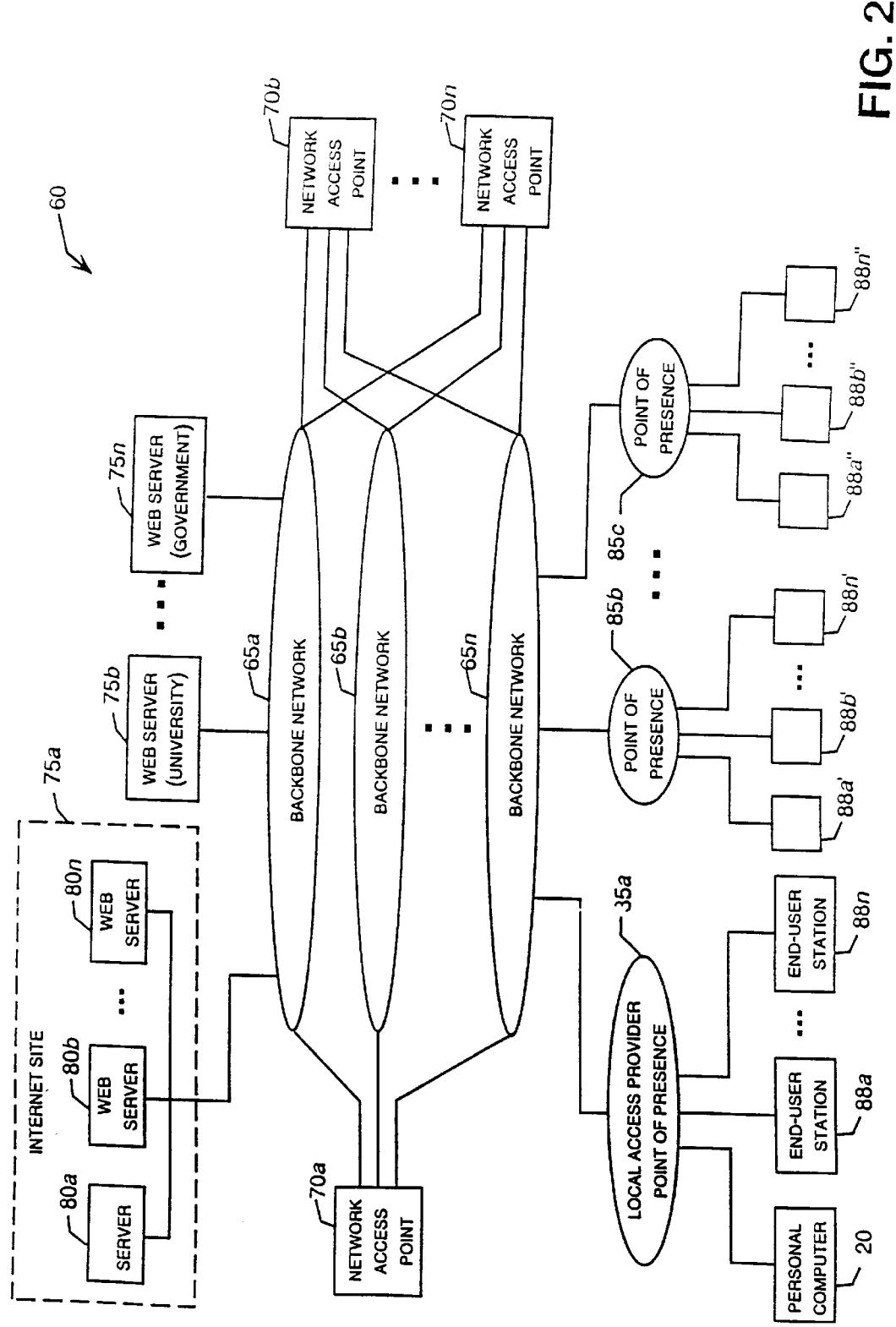
FIG. 2 is a functional block diagram of the Internet representing a portion of the operating environment of an exemplary embodiment of the present invention.

FIG. 2 is a functional block diagram of the Internet 60, a distributed electronic computing network that provides a portion of the operating environment for the preferred embodiment of the present invention. The Internet has in recent years become a mainstream commercial communication resource. E-mail and remote access to computer servers are currently widely used tools for reaching customers. Physically, the Internet is an interconnected collection of thousands of computer networks, tens of thousands of computers, and tens of millions of individual stations operated by end users. The user of the preferred embodiment of the present invention may be such an end-user. As is well known to those skilled in the art, to access an Internet site, an end user need only transmit the site's universal resource locator (URL) created in accordance with the standardized Domain Name System (DNS).

The Internet 60 includes a plurality of backbone networks 65a through 65n. These backbone networks form an international grid of high-speed, high-capacity data communication lines interconnecting a number of massive computers that serve as large-scale processing points or nodes. The backbone networks 65 are interconnected with each other through a plurality of network access points 70a through 70n. These network access points are interfaces through which information is communicated from one backbone network to another. The configuration and operation of the Internet backbone is well known to those skilled in the art and will not be further described herein.

The Internet 60 includes a plurality of Internet sites 75a through 75n. These Internet sites are generally operated by corporations, universities, and governmental organizations. Each Internet site may include one or more repositories of information and resources that may be accessed over the Internet. Each Internet site, as represented by the Internet site 75a, may include a plurality of web servers 80a through 80n. Each of these web servers may provide "home pages" to be visited, files to be read or downloaded, applications to be shared, and the like.

The Internet 60 also includes a plurality of points of presence 85a through 85n that are operated by local access providers. These local access providers are in the business of providing Internet access to end user stations. In the preferred embodiment of the present invention, the personal computer 20, shown in FIG. 1, is an end-user station. As shown in FIG. 2, the point of presence 85a provides Internet access to the personal computer 20 (end user station) and other end user stations 88a through 88n, the point of presence 85b provides Internet access to end user stations 88a' through 88n', etc. All together, the points of presence 85 can provide Internet access to numerous end-user stations 88. Each point of presence 85, and each end user 88, may, but need not, provide home pages for access by others on the Internet 60.

Having described an exemplary operating environment for the present invention, it will prove helpful to generally discuss encoding systems detected by an exemplary embodiment of the present invention.

Encoding Systems

The encoding systems discussed below are well known to those skilled in the art, but a general discussion of those systems will prove helpful for the subsequent description of an exemplary embodiment of the present invention.

As briefly discussed above, data and text is encoded to place the data and text in a format that allows it to be read and processed by computers. An encoding also specifies certain information about the underlying format of the text or data file. In US-ASCII, for example, each character can be represented as a single byte. In other encodings, multiple bytes may be required to represent a single character. Encodings that require only a single byte per character are known as single byte encodings. Likewise, encodings that may require more than one byte per character are known as multi-byte encodings. Multi-byte encodings may have characters of different lengths. Examples of multi-byte encodings are Shift-JIS (Japanese encoding that has both one and two byte characters) and EUC-TW (Traditional Chinese encoding that has one, two and four byte characters).

Typically, an encoding specifies the following set of rules: (1) the code-point ranges that are legal for the encoding; and (2) the set of code-point/character mappings. A code-point may technically be legal according to the first rule, but may not have a character assigned to it; and (3) the number of bytes per character. The number of bytes per character may be fixed, for example, US-ASCII (one byte per character) or Unicode/UCS-2 (two bytes per character). Alternatively, the number of bytes per character may vary. For multi-byte encodings, the set of trail-byte code-points that is legal for each lead-byte or class of lead-bytes is specified.

If the number of bytes per character varies, the encoding system also specifies the rules by which a computer encoding reader will know how many bytes to read for a given character. This is typically done in a number of different ways. First, lead bytes are classified into ranges that correspond to a certain number of expected trail bytes. As is known to those skilled in the art, a lead byte is the first byte of a multi-byte character sequence, and a trail byte is one of the following bytes in the multi-byte sequence. Second, lead bytes have encoded within them the number of expected trail bytes, for example, UTF-8. Third, the encoding incorporates escape sequences which explicitly "shift" the data from one mode to another, for example, ISO-2022-JP (JIS).

In and exemplary embodiment, the present invention provides an encoding detection system that requires minimal user intervention. Preferably, the system of the present invention is able to distinguish among numerous encoding systems. In an exemplary embodiment the present invention is able to distinguish among the following eleven encoding systems: Japanese (Shift-JIS, ISO-2022-JP (JIS), EUC-JP); Simplified Chinese (GBK, EUC-CN); Traditional Chinese (Big5, EUC-TW); Korean (Wansung, ISO-2022-KR, EUC-KR); and Multi-lingual (UTF-8).

While these eleven encoding systems are well known to those skilled in the art, it will prove helpful to generally describe each encoding system before proceeding with the detailed description.

By way of introduction of the information discussed below, it should be understood that typically EUC encodings define one to four active character sets called "code sets," numbered 0 to 3. A character set defines a set of characters, while an encoding defines, among other things, the numeric representation of those characters. For example, US-ASCII is both a character set and an encoding (the characters are ". . . , a, b, c, d, e, . . . " and their numeric representations are ". . . , 97, 98, 99, 100, 101, . . . "). Character sets referenced as part of the definitions for the various encoding systems are described below in Tables I–XI.

The source for the information tabulated in Tables I–XI is Ken Lunde, *Understanding Japanese Information Processing* (O'Reilly & Associates 1993) ISBN: 1-56592-043-0 and Ken Lunde, *CJK.INF: An Online Companion to Understanding Japanese Information Processing* (1996) (available from ftp://ftp.ora.com/pub/examples/nutshell/ujip/doc/cjk.inf).

TABLE I

| EUC-CN EUC Code Sets | Encoding Range |
|---|---|
| Code set 0 (ASCII or GB 1988-89) | |
| Byte range | 0x21–0x7e |
| Code set 1 (GB 2312-80) | |
| First byte range | 0xa1–0xfe |
| Second byte range | 0xa1–0xfe |
| Code set 2 (unused) | |
| Code set 3 (unused) | |

EUC-CN (EUC encoded GB 2312-80) is identical to GBK in the 0xa1a1-0xfefe range. EUC-CN and GBK may share a mapping table for the purpose of performing the code point mapping check on data in this range. EUC-CN has one and two byte characters. Legal byte ranges are shown, above in Table I, as are valid trail byte ranges for those lead bytes.

TABLE II

| EUC-JP EUC Code Sets | Encoding Range |
|---|---|
| Code set 0 (ASCII or JIS X 0201-1976 Roman) | |
| Byte range | 0x21–0x7e |
| Code set 1 (JIS X 0208) | |
| First byte range | 0xa1–0xfe |
| Second byte range | 0xa1–0xfe |
| Code set 2 (half-width katakana) | |
| First byte value | 0x8e |
| Second byte range | 0xa1–0xdf |
| Code set 3 (JIS X 0212-1990) | |
| First byte value | 0x8f |
| Second byte range | 0xa1–0xfe |
| Third byte range | 0xa1–0xfe |

In an exemplary embodiment of the present invention, ISO-2022-JP and EUC-JP share a mapping table. This mapping table can be used to perform the code point mapping check. EUC-JP has one, two and three byte characters. Legal byte ranges are shown, above in Table II, as are valid trail byte ranges for those lead bytes.

TABLE III

| EUC-KR EUC Code Sets | Encoding Range |
|---|---|
| Code set 0 (ASCII or KS C 5636-1993) | |
| Byte range | 0x21–0x7e |
| Code set 1 (KS C 5601-1992) | |
| First byte range | 0xa1–0xfe |
| Second byte range | 0xa1–0xfe |
| Code set 2 (unused) | |
| Code set 3 (unused) | |

EUC-KR (EUC encoded KS C 5601-1992) is identical to Wansung in the 0xa1a1-0xfefe range. Therefore, EUC-KR and Wansung may share a mapping table for the purpose of performing the code point mapping check on data in this range. EUC-KR has one and two byte characters. Legal byte ranges are shown, above in Table III, as are valid trail byte ranges for those lead bytes.

TABLE IV

| EUC-TW EUC Code Sets | Encoding Range |
|---|---|
| Code set 0 (ASCII) | |
| Byte range | 0x21–0x7e |
| Code set 1 (CNS 11643-1992, Plane 1) | |
| First byte range | 0xa1–0xfe |
| Second byte range | 0xa1–0xfe |
| Code set 2 (CNS 11643-1992, Planes 1–16) | |
| First byte value | 0x8e |
| Second byte range | 0xa1–0xb0 |
| Third byte range | 0xa1–0xfe |
| Fourth byte range | 0xa1–0xfe |
| Code set 3 (unused) | |

EUC-TW has one, two and four byte characters. Legal byte ranges are shown, above in Table IV, as are valid trail byte ranges for those lead bytes.

TABLE V

| Big5 | |
|---|---|
| | Encoding Ranges |
| Two-byte Standard Characters | |
| First byte range | 0x81–0xfe |
| Second byte ranges | 0x40–0x7e, 0xa1–0xfe |
| One-byte Characters | |
| ASCII | 0x21–0xfe |

Big5 has one and two byte characters. Legal byte ranges are shown, above in Table V, as are valid trail byte ranges for those lead bytes.

TABLE VI

| GBK | |
|---|---|
| | Encoding Ranges |
| Two-byte Standard Characters | |
| First byte range | 0x81–0xfe |
| Second byte ranges | 0x40–0x7e and 0x80–0xfe |
| One-byte Characters | |
| ASCII | 0x21–0x7e |

GBK has one and two byte characters. Legal byte ranges are shown, above in Table VI, as are valid trail byte ranges for those lead bytes.

TABLE VII

| ISO-2022-JP (JIS) | |
|---|---|
| | Escape Sequence |
| One-byte Character Sets | |
| ASCII (ANSI X3.4-1986) | <ESC> ( B |
| JIS X 0201-1976 Roman | <ESC> ( J |
| Half-width katakana | <ESC> ( I |
| Two-byte Character Sets | |
| JIS C 6226-1978 | <ESC> $ @ |
| JIS X 0208-1983 | <ESC> $ B |
| JIS X 0208-1990 | <ESC> & @ <ESC> $ B |
| JIS X 0212-1990 | <ESC> $ ( D |

ISO-2022-JP is an application of the ISO-2022 seven and eight bit encoding standard. All characters in ISO-2022-JP (JIS) are either one or two bytes. However, the escape sequences vary in length. Listed, above in Table VII, are the escape sequences the method of the present invention recognizes as special indicators of this encoding. As should be understood to those skilled in the art, the escape sequences for ASCII and JIS-Roman may be used in a variety of ISO-2022 applications, and therefore, may not uniquely identify ISO2022-JP (JIS)

TABLE VIII

ISO-2022-KR

| | Escape Sequence |
|---|---|
| One-byte Character Sets | |
| ASCII (ANSI X3.4-1986) | <SI> |
| Two-byte Character Sets | |
| KS C 5601-1992 | <SO> |
| Identifying Escape Sequence | |
| KS C 5601-1992 | <ESC>$ ) C |

ISO-2022-KR is an application of the ISO-2022 seven and eight bit encoding standard. There must be a single occurrence of the "identifying" escape sequence for KS C 5601-1992 (<ESC>$ ) C) before any KS C 5601-1992 characters. <SI> and <SO> are then used to shift between that character set and ASCII. <SI> and <SO> cannot be assumed to be identifying escape sequences, as they can occur in any ISO-2022 application. Characters are one or two bytes in length as shown in Table VIII.

TABLE IX

Shift-JIS

| | Encoding Ranges |
|---|---|
| Two-byte Standard Characters | |
| First byte ranges | 0x81–0x9f, 0xe0–0xef |
| Second byte ranges | 0x40–0x7e, 0x80–0xfc |
| Two-byte User-Defined Characters | |
| First byte range | 0xf0–0xfc |
| Second byte ranges | 0x40–0X7e, 0x80-0xfc |
| One-byte Characters | |
| Half-width katakana | 0xa1–0xdf |
| ASCII/JIS-Roman | 0x21–0x7e |

Shift-JIS has one and two byte characters. Legal byte ranges are shown, above in Table IX, as are valid trail byte ranges for those lead bytes.

TABLE X

UTF-8

| One-byte UTF-8 Characters | Unicode Range |
|---|---|
| ASCII | 0x0000–0x007f |
| Two-byte UTF-8 Characters | Unicode Range |
| *** | 0x0080–0x07ff |
| Three-byte UTF-8 Characters | Unicode Range |
| *** | 0x0800–0xffff |

UTF-8 is an algorithmic transformation of Unicode (UCS-2 and UCS-4) characters. The method and system of the present invention deal only with encoded UCS-2 (i.e., two-byte Unicode). Unicode characters are broken into three ranges when converted to UTF-8, as shown in Table X.

TABLE XI

Wansung

| | Encoding Ranges |
|---|---|
| Two-byte Standard Characters | |
| First byte range | 0x81–0xfe |
| Second byte ranges | 0x40–0x7e and 0x80–0xfe |
| One-byte Characters | |
| ASCII | 0x21–0x7e |

Wansung has one and two byte characters. Legal byte ranges are shown, above in Table XI, as are valid trail byte ranges for those lead bytes.

Encoding Detection

Figure 3:
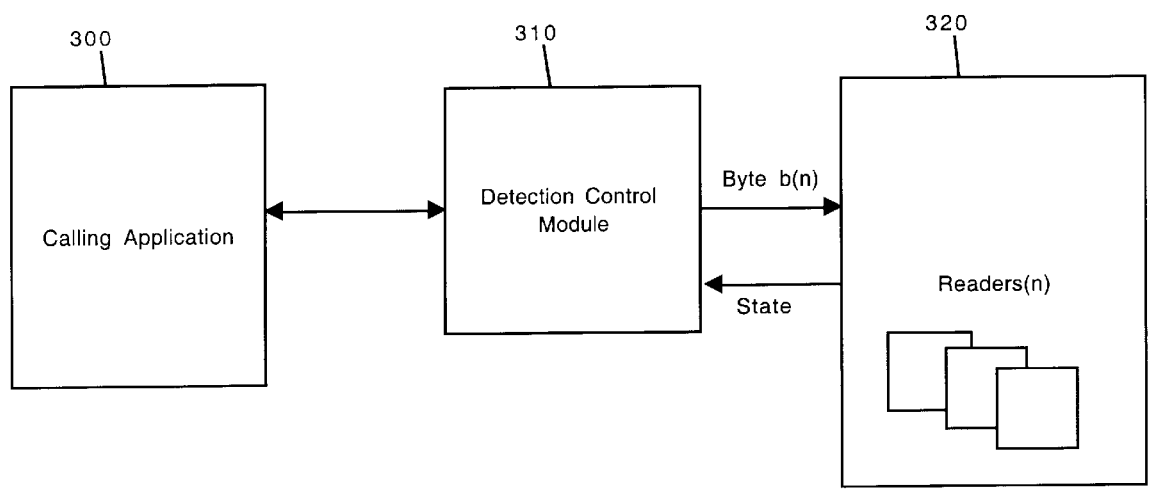
FIG. 3 is a simplified block diagram illustrating the interaction of a calling application with an encoding detection program in accordance with an exemplary embodiment of the present invention.

Referring now to FIG. 3, in an exemplary embodiment, a control module 310 passes data (one byte at a time) to eleven readers 320, each of which tries to read the data according to the rules for one of the eleven exemplary encoding systems described above in Tables I–XI. The control module 310 is responsible for overall control of the encoding system detection process. Its chief responsibilities include initializing all readers 320, maintaining a count of active readers, requesting one byte of input at a time from a calling application 300, gathering and updating statistics based on the current byte being read, passing each byte in turn to each of the readers 320 remaining in the active list, and returning the detected encoding system to a calling application 300. As is well known to those skilled in the art, the calling application 300, in this context, is any application attempting to read encoded data or text from a file downloaded by the user to the user's computer 20. As should be understood, the file downloaded by the user may be from any computer readable medium, such as a floppy disk or from an on-line source via the Internet 60.

Each reader 320 is a state machine that is removed for the list of active readers when it has detected data that violates the rules associated with an encoding system with which it has been configured. The readers 320 are run in parallel. The readers 320 remaining after the data is analyzed are candidates for the detected encoding system. As should be understood to those skilled in the art, and as will be discussed in detail below, a reader records the current state, detects special identifying byte sequences, detects common character sequences, and records the number of detected common character sequences.

It will be helpful at this point to describe an exemplary reader. The Big5 reader is a good example of all readers 320 utilized by an exemplary embodiment of the present invention, except for the ISO-2022 readers. The primary difference between the ISO-2022 readers and the others is that the ISO-2022 readers only "watch" for the meaningful escape sequences (though the use of state tables to do so is similar to the use of state tables in the other readers to validate input). The reader utilized to detect Big5 encoding has the following rules, Table XII below, for legal single/lead/trail byte characters (values are listed in hex).

TABLE XII

Big5 Reader

| | Encoding Range |
|---|---|
| Two-byte Standard Characters | |
| first byte range | 0xa1–0xfe |

TABLE XII-continued

Big5 Reader

| | Encoding Range |
|---|---|
| second byte ranges | 0x40–0x7e, 0xa1–0xfe |
| One-byte Characters | |
| ASCII | 0x21–0x7e, other legal chars < 0x21 |

The Big5 reader acts essentially as a state machine that can be in one of four states:

State 0—the "initial" state. The reader expects the next byte, b(n), to be either a valid single byte character or the first byte of a double-byte character (lead byte).

State 1—the reader has detected a valid lead byte and expects b(n) to be a valid trail byte.

Accept (ACC)—The "Accept" state. The reader has detected a complete, valid character (either single or double byte).

Error (ERR)—The "Error" state. The reader has detected invalid input.

Accordingly, if the reader is in State 0 and a valid lead byte is detected, the reader enters State 1. If the reader is in State 0 and a valid single byte character is detected, reader enters the Accept state. If the reader is in State 0 and an invalid input is detected, the reader enters the Error state. The state table for Big5, rgchBig5NextState[ ][ ], is a double array, indexed first by current state and then by the class of the current byte (bytes are classified by the range they fall into, for example length equal to one). For example, _rgchBig5NextState[ST0][x213f] falls into State ACC (the accept state). In other words, if the current state is ST0 (State 0 or initial state) and a character in the range 0x21–0x3f (inclusive) is detected, the reader moves to the Accept state (a character in that range is a valid single byte character).

Another example, _rgchBig5NextState[ST0] [x008e] falls into State 1. That is, if the reader is in ST0 and detects the character 1x8e (x008e is notation for just the character 0x8e, as opposed to a range of length equal to one), it moves into ST1 (State 1). This is because 0x8e is a valid lead byte for Big5. Finally, _rgchBig5NextState[ST1][ateof] falls into the Error state (the Error state). The string "ateof" is a special class meaning "end-of-input." What this particular table entry means is that, if the reader has detected a valid lead byte, but the input ends at that point, an error results.

If the Big5 reader enters the ERR state, it turns itself off and returns an "error" value to the control module. If the reader enters the ST1 state, it returns an "intermediate" return value to the module indicating that the data so far has been valid, but that the current byte did not complete a valid character sequence. As should be understood to those skilled in the art, there are more intermediate states than ST1 for encodings that have more than one and two byte characters sequences.

If the reader enters the ACC state, it knows it has detected a valid (and complete) input character. It is at this point that the reader tries to further examine the complete character. The reader has a small buffer which can hold one character, of the longest length expected by the reader (two bytes for Big5) which it uses to store the bytes of the current character. The character is first checked against a mapping table for the associated encoding. If the character is not found in the mapping table, the reader enters the ERR state. If the character is found in the mapping table, it is also checked to determine whether it begins or completes a common character pair for the encoding represented by the reader.

The reader "remembers" a couple of things for each character pair, including the number of times the pair has been detected in the input, and whether or not a match on that pair is expected (i.e., the first character has been detected and now the second character is "expected"— essentially a mini-state-table).

Once the reader enters the Accept state and completes all additional analysis of the current completed byte sequence, the reader resets its state to State 0. Accordingly, the reader once again enters the initial state so that it is ready to receive the next byte of data.

Encoding Detection

Figure 4A:
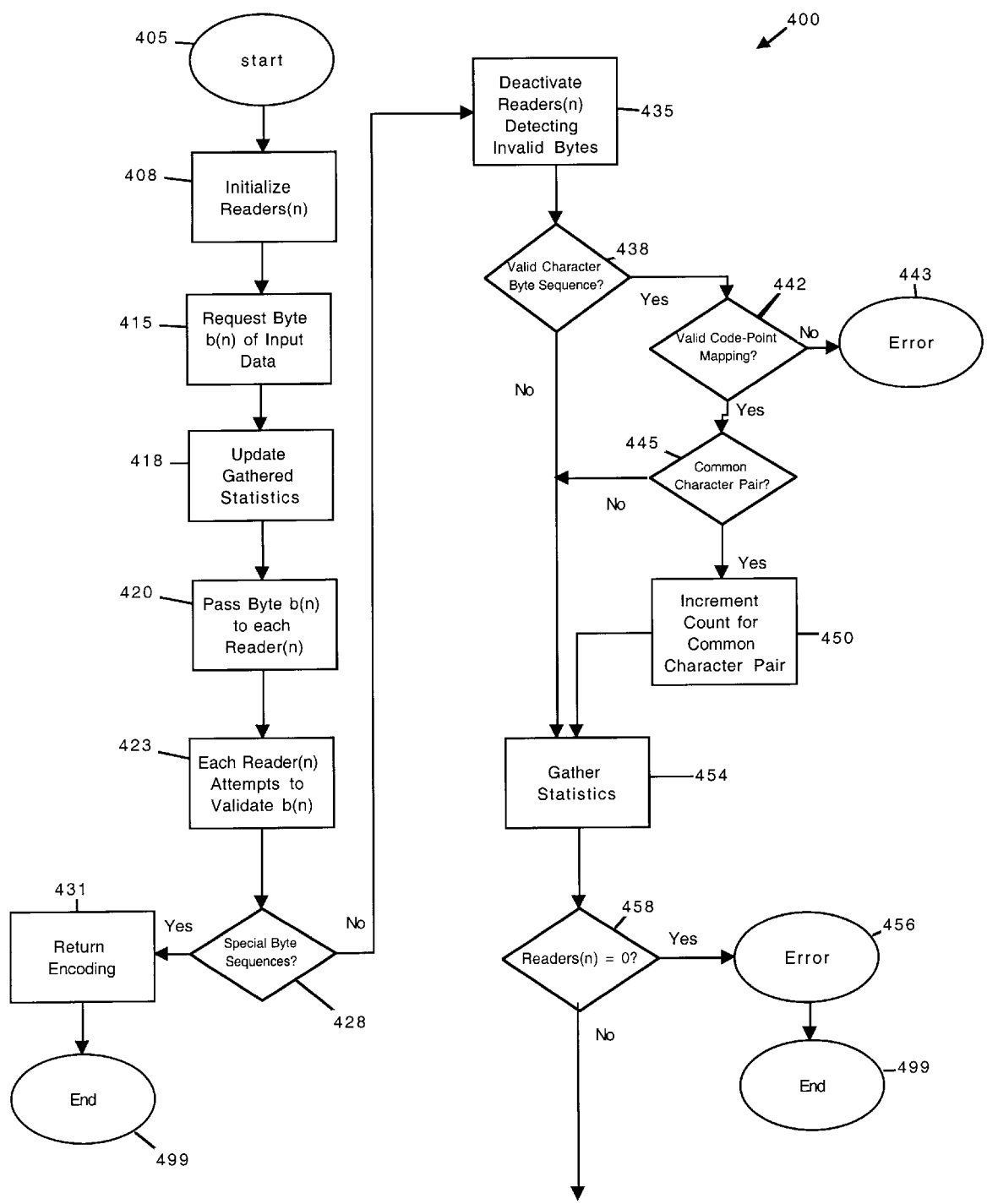
FIGS. 4a and 4b are flow diagrams illustrating an exemplary method of detecting an encoding system.
Figure 4B:
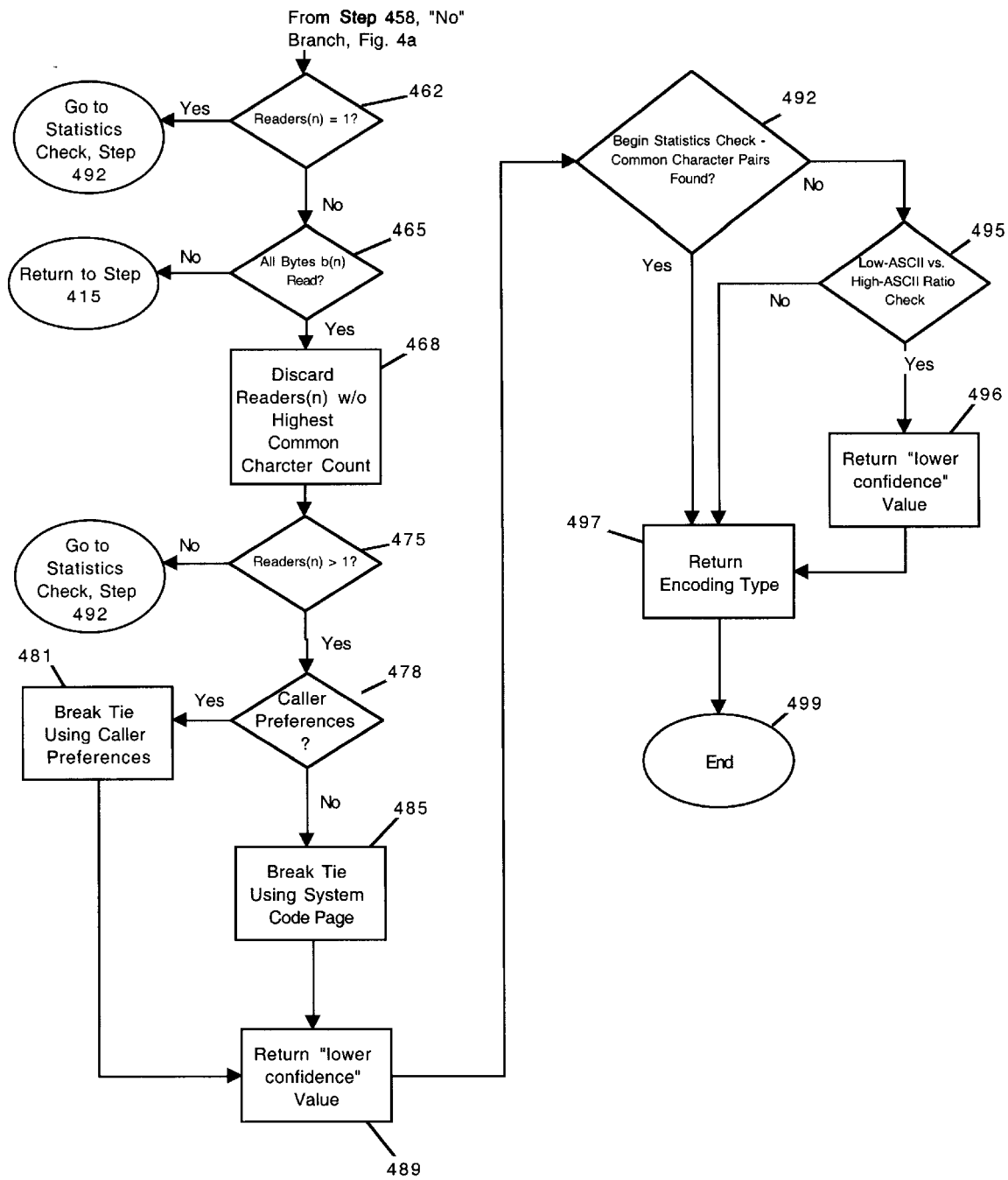

Briefly described, the present invention can analyze encoded text or data in a computer readable text or data file to determine the encoding system utilized for that text or data. FIGS. 4a–4b are flow charts illustrating a method 400 for detecting encoding systems in accordance with an exemplary embodiment of the present invention. Those skilled in the art will appreciate that this exemplary embodiment is a computer-implemented process that is carried out by a computer in response to input from the user and instructions provided by a program control module 310.

Referring to FIGS. 3, 4a and 4b, the method 400 begins at step 405 and proceeds to step 408. The method 400 may proceed automatically to step 408 after the user attempts to retrieve a text or data file onto his or her computer 20 using an exemplary calling application, such as a word processor. As should be understood to those skilled in the art, the user may download the text or data from any computer readable medium, such as a floppy disk, or from an on-line source, such as the Internet 60. Alternatively, as should be understood by those skilled in the art, the user may be provided with a user interface (UI) through which the user may provide information to the calling application such as the human language (e.g., Japanese) in which the data or text is written. As will described below, such information may be helpful for detecting the encoding system.

At step 408, the control module 310 initializes the readers 320 for all supported encoding systems. As a part of initialization of the readers 320, the control module 310 sets the list of readers to a count of readers(n) where "n" is the total number of active readers. In an exemplary embodiment the list of readers includes the eleven readers described above. For the purposes of the following discussion "readers(n)" refers to the list of active readers at any given step.

At step 415, one byte of input is requested from the calling application 300. Bytes of data are requested one byte at a time. At step 418, statistical information gathered for the last read byte of input is updated. It should be understood that no statistical information will be available until after the byte is passed to the readers(n).

The first byte(n) of data is passed to each of the readers(n) in the active list at step 420. This allows all readers to analyze the input byte(n) in parallel. Input data is read one byte at a time. The readers(n) look for the following errors when attempting to validate the input: (1) illegal code-point ranges, (2) illegal lead-byte/trail-byte combinations, (3) legal but unmapped code-points. Each reader(n) is responsible for validating the stream of bytes it receives from the control module 310 according to the rules of the encoding system it supports.

At step 423, each reader(n) attempts to validate the passed byte b(n) of input according to the rules for the encoding system each reader(n) supports. Each reader(n) returns one of three values for each byte, b(n), it receives from the control module: (1) Success: b(n) completed a valid character byte sequence; (2) Failure: b(n) caused reader to enter an invalid state; and (3) Intermediate: b(n) is a valid byte, but character sequence is not complete.

At decision step 428, a determination is made whether any of the readers(n) detected special identifying byte sequences. If a reader(n) associated with an encoding that contains special identifying byte sequences returns that it has found such a sequence, further reading of input is ceased, and the method proceeds along the "Yes" branch to step 431. At step 431 the encoding associated with the reader detecting the special identifying byte sequences is returned as the appropriate encoding for the text or data being analyzed. The method then proceeds to and ends at step 499.

It should be understood to those skilled in the art that special identifying byte sequences uniquely identify a particular encoding system. An example of such special identifying byte sequences include certain of the escape sequences that occur in ISO-2022-JP (JIS). Thus, if a reader(n) detects one of these special sequences, the encoding it represents is automatically chosen as the detected encoding system at step 431. That is, if b(n) completes such a sequence, the reader(n) and the control module 310 assume a match on that encoding system. As is well known to those skilled in the art, for encoding systems that contain special identifying byte sequences, such as ISO-2022-KR and ISO-2022-JP (JIS), the associated readers(n) typically are optimized to watch for these sequences.

For any readers(n) that failed to validated the byte(n) as a special identifying byte sequence, the method follows the "No" branch at step 428 to step 435. At step 435, each reader(n) that failed to validate the byte b(n) as a valid byte according to the rules of the encoding supported by that reader enters into an invalid state and is deactivated or "turned off." In an exemplary embodiment, as a performance enhancement, the control module 310 also records which readers are turned off and does not send any additional input to those readers(n). As will be understood, this process of elimination of readers leads to the detection of the encoding system utilized by the data or text being analyzed.

At decision step 438, each remaining reader(n) determines whether the b(n) completed a valid character byte sequence, that is, a success state. As is understood by those skilled in the art, a character byte sequence is a sequence of bytes which are recognized by a given reader(n) as occurring in the encoding system supported by that reader(n). If the byte b(n) completes a valid character byte sequence, the method follows the "Yes" branch to step 442 for any readers(n) which detected a completed valid character byte sequence. It should be understood that for those readers(n) that remain active after step 435, but which did not detect a completed valid character byte sequence, the method proceeds via the "No" branch to step 454, described below.

At decision step 442, each reader(n) that detected a completed byte sequence validates the code-point of the byte(n) to ensure that it maps to a valid character. Any reader(n) which does not find that the byte(n) maps to a valid character returns an error value, and that reader(n) is deactivated at step 443, as described above.

For any readers(n) remaining after step 442, the method proceeds to step 445, via the "Yes" branch, and the remaining readers(n) check the valid mapped code-points from step 442 to check whether they complete a common character pair in the list of common pairs associated with the encoding system supported by those readers(n). If so, at step 450, the occurrence of that common character pair is counted. The method then proceeds to step 454. If the valid mapped code-points from step 442 do not complete a common character pair in the list of common pairs, the method follows the "No" branch at step 445 to step 454 without counting an occurrence at step 454.

At step 454, statistics about the byte b(n) are gathered. As will be described below, the statistics are used for a number of purposes, primarily as confidence measures and tie-breakers. It should be understood that the statistics gathered at step 454 are gathered as each byte of data is read. Statistics gathered at step 454 include the count of common character pairs detected at step 450.

In Japanese text or data for example, the character pair "de su" is very common. Finding such character pairs may be a strong indication of an encoding match. The various readers(n) are configured with lists of common character pairs for their particular encoding. As the readers validate the data, they also keep track of how many of each character pair they detect, as described for step 445 above. In an exemplary embodiment, each detected common character pair may be assigned a different weight. As should be understood by those skilled in the art, weighting the detected common character pairs may be used to further narrow the list of active readers (and encoding systems) during ambiguity resolution discussed below.

In an exemplary embodiment of the present invention, statistics gathered at step 454 also include the ratio of low-ASCII to high-ASCII bytes in the input byte b(n). In an exemplary embodiment, the control module 310 tracks the ratio of low-ASCII to high-ASCII bytes in the input byte b(n). As is well known to those skilled in the art low-ASCII bytes typically are considered those bytes with a value of less than 128, and high-ASCII bytes are those bytes with a value of 128 or greater. As will be discussed below, a high percentage of low-ASCII bytes can be an indication that the encoded data or text may not be encoded by one of the defined encoding systems. After statistical information is gathered at step 454, the method proceeds to step 458.

At decision step 458, a determination is made whether the number of remaining readers(n) is equal to zero. That is, whether all readers have been deactivated at previous steps. If the number of readers(n) is zero, at step 458, the method proceeds to step 456. At step 456, a value is returned to the control module 310 indicating that the text or data input is not one of the supported encodings, therefore, the method proceeds to and ends at step 499. If the remaining readers(n) do not equal zero, the method proceeds to step 462. At step 462, a determination is made whether the number of remaining readers(n) is equal to one. If the number of remaining readers(n) is equal to one, the method proceeds to a statistical analysis at step 492, described below.

If the number of remaining readers(n) is greater than one at step 462, the method proceeds to step 465. At step 465, a determination is made whether all bytes b(n) of data in the data or text being analyzed have been passed to the readers (n). If bytes b(n) of data remain to be read by the remaining readers(n), then the method returns to step 415 and requests the next byte b(n) of input data or text. It should be understood that this process will continue until the number of remaining readers(n) equal zero (step 458), one (step 462), or until all bytes b(n) of data have been passed.

If all bytes b(n) of data have been read and the number of remaining readers(n) is still greater than one at step 465, the method determines that an ambiguity exists as to which encoding system associated with the remaining readers(n) is the correct encoding system. Accordingly, the method proceeds to step 468 to begin ambiguity resolution. At step 468, all remaining readers(n) except for the reader(n) with the highest common character byte sequence (step 450) are deactivated.

At step 475, if the remaining number of readers(n) (and associated encoding systems) is now equal to one, the method proceeds to a statistical analysis at step 492, described below. If the remaining number of readers(n) (and associated encoding systems) is still greater than one, the method proceeds to step 478. At step 478, a determination is made as to whether any calling application preferences have been identified which may be used to break a tie between remaining readers(n).

If calling application preferences have been identified, the method proceeds to step 481 and breaks any ties using the calling application preferences. The method then proceeds to step 489. In an exemplary embodiment, and as will be understood by those skilled in the art, the calling application preferences may be in terms of human language or encoding family (MS Microsoft® DBCS, EUC, etc.). For example, if the calling application is a word processor, the user may be able through a user interface to designate that the human language of the text or data is Japanese. Accordingly, if the method is attempting to break a tie between a Japanese encoding system and a Chinese encoding system, the method will use the calling application preference provided by the user to select the Japanese encoding.

If no calling application preferences were specified at step 478, the method proceeds to step 485 and utilizes the system code page to break the tie between any remaining readers(n). In either of the above cases (caller preferences or system code page), the control module 310 will remember that the input data or text matched more than one reader(n) and associated encoding system. Accordingly, the method will proceed to step 489, and a special "lower-confidence" value will be returned.

Once the number of remaining readers(n) is equal to one (either through ambiguity resolution or because the input data or text matched only one encoding), the method proceeds to step 492 where a limited statistical analysis is begun. As should be understood, the statistical analysis is a final check to increase the confidence in a "lower-confidence" detection, as described above, or to verify an encoding match previously detected.

At step 492, a determination is made as to whether any common character byte sequences were detected (step 450). If the reader(n) detected any common character sequences, the method proceeds to step 497 and the encoding associated with that reader(n) is returned as the correct encoding. It should be understood that finding a common character byte sequence overrides a "lower-confidence" return value in the case of ambiguous data or text described above.

If the reader(n) did not find any common character sequences, the method follows the "No" branch and proceeds to step 495. At decision step 495, the ratio of low-ASCII to high-ASCII bytes is checked. If that ratio is above a certain threshold, the method follows the "Yes" branch to step 496, and a special "lower-confidence" value is also returned indicating that the text or data may not actually be encoded with the encoding system associated with the remaining reader(n). The method then proceeds to step 497 and returns the encoding system associated with that reader with the accompanying "lower-confidence" value. If the ratio of low-ASCII to high-ASCII bytes is less than the certain threshold, the method follows the "No" branch at step 495 to step 497. Accordingly, at step 497, the encoding system associated with that reader(n) is returned as the correct encoding system, without an accompanying "lower-confidence" value.

The assumption is that a high percentage of low-ASCII bytes may mean that the file is not one of the known encoding systems, even though the text or data may have "passed" the tests for various supported encoding systems, as described above. In an exemplary embodiment, the encoding systems supported by the present invention preferably "preserve" the low-ASCII range. Accordingly, a file that contains nothing but low-ASCII bytes will still look like a legally encoded file, and therefore, reduces the confidence in the selected encoding system. In an exemplary embodiment, a preferable threshold of low-ASCII to high-ASCII bytes is 95% low-ASCII bytes.

At step 497, the encoding system associated with the last remaining reader(n) is returned as the correct encoding. The method ends at step 499.

EXAMPLE 1

The exemplary embodiment of the present invention is best illustrated by showing, as an example, how the method and system analyze data encoded using the Big5 encoding system and encountered by a user of a word processing software application. For purposes of this example, a user of a word processing software application attempts to download a document encoded using Chinese Big5 encoding. In accordance with and exemplary embodiment of is the present invention, the stream of bytes of data, shown in Table 1 below, are passed to the readers(n) in accordance with the method described above and illustrated in FIGS. 4a–4b.

The results obtained from partial analysis of the data stream shown in Table XIII are shown in Table XIV. As shown in Table 1, 14 total bytes of data were presented for analysis. Four low-ASCII bytes were found which is under the threshold of 95% low-ASCII bytes. After partial analysis of the data stream, two encoding systems remained—Big5 and GBK. Of the two remaining encoding systems, a common character byte sequence for Big5 is detected. Accordingly, the Big5 encoding system is returned with normal confidence because the common character byte sequence detected for Big5 resolves the ambiguity between the two remaining encoding systems.

TABLE XIII

| Data   | a4 | 6a | ef | c2 | a4 | c0 | bb | 4f | a5 | 5f | a6 | 5d | ac | b0 |
|--------|----|----|----|----|----|----|----|----|----|----|----|----|----|----|
| Offset | 0  | 1  | 2  | 3  | 4  | 5  | 6  | 7  | 8  | 9  | 10 | 11 | 12 | 13 |

TABLE XIV

| Event | Encoding | Data Offset | Character | Reason |
|---|---|---|---|---|
| Dropped out | UTF-8 | 0 | 0×a4 | Invalid lead byte |
| Dropped out | EUC-CN | 1 | 0×6a | Invalid lead byte |
| Dropped out | EUC-JP | 1 | 0×6a | Invalid lead byte |
| Dropped out | EUC-KR | 1 | 0×6a | Invalid lead byte |
| Dropped out | EUC-TW | 1 | 0×6a | Invalid lead byte |
| Dropped out | Shift-JIS | 3 | 0×c2 | Unmapped code point |
| Dropped out | Wansung | 9 | 0×5f | Unmapped code point |
| Common Sequence Found | Big5 | 13 | 0×b0 | a65dacb0 is a common sequence for Big5 "yin wei" |
| End of Input | *** | *** | *** | *** |

EXAMPLE 2

The exemplary embodiment of the present invention is illustrated by another example by showing how the method and system analyze data encoded using the Japanese (ISO-2022-JP (JIS)) encoding system and encountered by a user of a word processing software application. For purposes of this example, a user of a word processing software application attempts to download a document encoded using the Japanese (ISO-2022-JP (JIS)) encoding system. In accordance with and exemplary embodiment of the present invention, the stream of bytes of data, shown in Table XV below, are passed to the readers(n) in accordance with the method described above and illustrated in FIGS. 4a–4b.

The results obtained from partial analysis of the data stream shown in Table XV are shown in Table XVI. As shown in Table 3, ISO-2022-JP (JIS) is returned as the applicable encoding system with normal confidence (although the data consisted solely of low-ASCII bytes) because an identifying byte sequence was found that overrides the "lower-confidence" return value associated with the high ratio of low-ASCII bytes.

TABLE XV

| Data | 61 | 62 | 63 | 1b | 24 | 42 | 24 | 4a | 35 | 21 | 47 | 3d | 24 | 72 |
|---|---|---|---|---|---|---|---|---|---|---|---|---|---|---|
| Offset | 0 | 1 | 2 | 3 | 4 | 5 | 6 | 7 | 8 | 9 | 10 | 11 | 12 | 13 |

TABLE XVI

| Event | Encoding | Data Offset | Character | Reason |
|---|---|---|---|---|
| Found Encoding | ISO-2022-JP (JIS) | 5 | 0x42 | Found identifying byte sequence |

As described herein, the present invention provides for detecting an encoding system used to encode computer readable text or data across a wide variety of encoding systems. Encoded data is passed from the desired text or data file to a series of code readers. Each code reader is programmed to read encoded data according to the rules of a given encoding system. When a given code reader is unable to validate a byte of data according to the encoding system rules associated with that reader, that reader is deactivated. If the list of readers is not eliminated to a single reader, ambiguity resolution is performed to narrow the list of readers to a single reader. Once the list of active readers is narrowed to one, the encoding system associated with that reader is returned as the encoding system with which the data is encoded. Statistics gathered on the data as it is read are used to confirm and augment detection of the encoding system.

While this invention has been described in detail with particular reference to exemplary embodiments thereof, it will be understood that variations and modifications can be effected within the spirit and scope of the invention as described herein and as defined in the appended claims.

What is claimed is:

1. A method of detecting an encoding system used to encode data, comprising the steps of:

reading the encoded data according to rules associated with each of a plurality of encoding systems;

determining whether the encoded data are valid according to the rules associated with each of a plurality of encoding systems where said rules are selected from the group consisting of: (1) code-point ranges that are legal for the encoding system, (2) a set of code-point/character mappings, and (3) a number of bytes per character;

discarding any of the plurality of encoding systems that do not validate the encoded data according to the rules associated with each of the plurality of encoding systems; and selecting a particular encoding system from the remaining encoding systems of the plurality of encoding systems by comparing said data to one or more characteristics of data encoded with said remaining encoding systems.

2. A method of detecting an encoding system used to encode data, comprising the steps of:

reading the encoded data according to rules associated with each of a plurality of encoding systems;

determining whether the encoded data are valid according to the rules associated with each of the plurality of encoding systems;

discarding any of the plurality of encoding systems that do not validate the encoded data according to the rules associated with each of the plurality of encoding systems;

determining whether the encoded data complete a byte sequence unique to the particular encoding system;

if the data complete the unique byte sequence, returning the particular encoding system associated with the unique byte sequence as the encoding system used to encode the data;

if the data do not complete the unique byte sequence, selecting a particular encoding system from the remaining encoding systems of the plurality of encoding systems;

determining whether the encoded data complete a common character sequence for any of the remaining encoding systems;

counting the number of common character sequences determined for any of the remaining encoding systems; and discarding all of the remaining encoding systems, except for the encoding system associated with the highest number of common character sequences determined.

3. The method recited in claim 2, wherein the step of determining whether the data complete a common character sequence for any of the remaining encoding systems, includes the steps of:

validating a code-point of the common character sequence to ensure the character sequence is mapped to a valid character; and verifying the validated code-point completes a common character sequence.

4. The method recited in claim 3, further comprising the steps of:

if more than one encoding system remains after the step of discarding all of the remaining encoding systems, except for the encoding system associated with the highest number of common character sequences determined, selecting the particular encoding system from the remaining encoding systems according to preferences associated with the encoded data.

5. The method recited in claim 4, further comprising the steps of:

gathering information about the encoded data; and reviewing the information to confirm the particular encoding system as the encoding system used to encode the data.

6. The method recited in claim 5, wherein the step of gathering information includes the steps of:

recording the number of low-ASCII bytes of the encoded data;

recording the number of high-ASCII bytes encoded data; and determining the ratio of low-ASCII bytes to high-ASCII bytes.

7. The method recited in claim 6, wherein each low-ASCII byte is a byte having a numerical representation less than 128; and each high-ASCII byte is a byte having a numerical representation of 128 or greater.

8. The method recited in claim 2, wherein the encoded data is read one byte at a time.

9. The method recited in claim 8, wherein each byte of encoded data is read by a plurality of code readers, each of said code readers being associated with one of the encoding systems.

10. The method recited in claim 9, wherein the step of discarding any of the plurality of encoding systems that do not validate the encoded data according to the rules associated with any of the plurality of encoding systems, includes discarding the code readers with which those encoding systems are associated.

11. A computer-implemented method of detecting an encoding system used to encode data, comprising the steps of:

reading the encoded data according to rules associated with each of a plurality of encoding systems;

determining whether the encoded data are valid according to the rules associated with any of the plurality of encoding systems;

discarding any of the plurality of encoding systems that do not validate the encoded data according to the rules associated with any of the plurality of encoding systems;

determining whether the encoded data complete a byte sequence unique to a particular one of the encoding systems;

if the encoded data complete the unique byte sequence, returning the particular encoding system associated with the unique byte sequence as the encoding system used to encode the data;

determining whether the encoded data complete a common character sequence for any of the remaining encoding systems;

counting the number of common character sequences determined for any of the remaining encoding systems;

discarding all of the remaining encoding systems, except for the encoding system associated with the highest number of common character sequences determined; and if more than one encoding system remains, selecting the particular one of the encoding systems from the remaining encoding systems according to preferences associated with the encoded data.

12. A computer-readable medium on which is stored a computer program for detecting an encoding system used to encode text or data, the computer program comprising instructions, which when executed by a computer, perform the steps of:

obtaining encoded data;

passing bytes of the encoded data to a plurality of code readers;

causing each of the plurality of code readers to read the bytes of encoded data according to rules associated with a particular encoding system, each of the plurality of code readers being associated with a different particular encoding system;

for each code reader of the plurality of code readers, determining whether the bytes of encoded data are valid bytes according to the rules associated with the particular encoding system associated with each code reader;

causing each code reader to determine whether the bytes of encoded data complete a byte sequence unique to the particular encoding system associated with each code reader;

if the bytes of encoded data complete said unique byte sequence, returning the particular encoding system associated with the unique byte sequence as the encoding system used to encode the bytes of encoded data;

if the bytes of encoded data do not complete said unique byte sequence, deactivating any of the code readers that fail to determine the bytes of encoded data are valid bytes of encoded data;

if one code reader remains after the step of deactivating any of the code readers that fail to determine the bytes of encoded data are valid bytes of encoded data, returning the particular encoding system associated with the one remaining reader as the encoding system used to encode the bytes of encoded data;

if more than one code reader remains after the step of deactivating any of the code readers that fail to determine the bytes of encoded data are valid bytes of encoded data, causing each remaining code reader to determine whether the bytes of encoded data complete a common character sequence for the particular encoding system associated with each remaining code reader;

causing each remaining code reader to gather statistical information on the bytes of bytes of encoded data;

deactivating each remaining code reader except for the remaining code reader with the highest number of common character sequences determined for the particular encoding system associated with each remaining code reader;

if one code reader remains after the step of deactivating each remaining code reader except for the remaining code reader with the highest number of common character sequences determined for the particular encoding system associated with each remaining code reader, returning the particular encoding system associated with the one remaining code reader as the encoding system used to encode the bytes of encoded data; and if more than one coded reader remains after the step of deactivating each remaining code reader except for the remaining code reader with the highest number of common character sequences determined for the particular encoding system associated with each remaining code reader, selecting one remaining code reader and returning the particular encoding system associated with the one remaining code reader according to preferences associated with the encoded bytes of encoded data as the encoding system used to encode the bytes of encoded data.

13. The method of claim 12, further comprising the step of:

reviewing the statistical information to verify the particular encoding system as the encoding system used to encode the bytes of encoded data.

14. A system for detecting an encoding system used to encode data, comprising:

a control module operative to receive bytes of encoded data from a data file; and a plurality of readers operative to read the bytes of encoded data according to rules associated with a particular encoding system, each of the plurality of readers being associated with a different particular encoding system, to determine whether the bytes of encoded data are valid bytes of encoded data according to the rules associated with the particular encoding system associated with each reader, to determine whether the bytes of encoded data complete a byte sequence unique to the particular encoding system associated with each reader, to return to the control module the particular encoding system associated with the unique byte sequence as the encoding system used to encode the bytes of encoded data, if the bytes of encoded data complete the unique byte sequence, to determine whether the bytes of encoded data complete a common character sequence, and to count the number of common character sequences determined.

15. The system of claim 14, whereby the control module is further operative to pass the bytes of encoded data to each of the plurality of readers one byte at a time.

16. The system of claim 15, whereby the plurality of readers are further operative to receive the bytes of encoded data one byte at a time from the control module.

17. The system of claim 14, whereby the control module is further operative to deactivate all of the plurality of readers, except those associated with the highest number of common character sequences determined; and to select a particular encoding system from the remaining encoding systems according to preferences associated with the encoded data.

18. The system of claim 17, whereby the plurality of readers are further operative to self-deactivate upon encountering invalid bytes of encoded data for the encoding systems associated with those readers.

* * * * *